(12) United States Patent
Mukkavilli et al.

(10) Patent No.: US 11,811,571 B2
(45) Date of Patent: Nov. 7, 2023

(54) RESOURCE ALLOCATION FOR PEAK REDUCTION TONES

(71) Applicant: QUALCOMM Incorporated, San Diego, CA (US)

(72) Inventors: Krishna Kiran Mukkavilli, San Diego, CA (US); June Namgoong, San Diego, CA (US); Taesang Yoo, San Diego, CA (US); Naga Bhushan, San Diego, CA (US); Saeid Sahraei, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/370,794

(22) Filed: Jul. 8, 2021

(65) Prior Publication Data

US 2022/0014407 A1    Jan. 13, 2022

Related U.S. Application Data

(60) Provisional application No. 63/050,582, filed on Jul. 10, 2020.

(51) Int. Cl.
*H04L 5/00* (2006.01)
*H04L 27/26* (2006.01)
*H04L 1/1607* (2023.01)

(52) U.S. Cl.
CPC ........ *H04L 27/2614* (2013.01); *H04L 1/1614* (2013.01); *H04L 5/0039* (2013.01); *H04L 5/0092* (2013.01)

(58) Field of Classification Search
CPC .. H04L 5/0039; H04L 1/1614; H04L 27/2614
See application file for complete search history.

(56) References Cited

U.S. PATENT DOCUMENTS

| 11,368,346 B1* | 6/2022 | Krishnan | ............ H04L 27/2614 |
| 2004/0218689 A1* | 11/2004 | Akhtman | ............ H04L 27/2624 |
| | | | 375/296 |

(Continued)

FOREIGN PATENT DOCUMENTS

| KR | 20100064665 A | 6/2010 |
| WO | WO-2010079788 A1 | 7/2010 |

OTHER PUBLICATIONS

International Search Report and Written Opinion—PCT/US2021/040999—ISA/EPO—dated Oct. 15, 2021.

(Continued)

*Primary Examiner* — Fahmida S Chowdhury
(74) *Attorney, Agent, or Firm* — Norton Rose Fulbright US LLP/Qualcomm Incorporated

(57) ABSTRACT

Wireless communication techniques that include techniques for allocating resources for peak reduction tones are discussed. A UE may receive from a base station an indication of one or more frequency resources that are allocated for uplink communication. The UE may also receive from the base station an indication of a subset of the one or more frequency resources allocated for uplink communication that are also allocated for transmission of one or more peak reduction tones. The UE may transmit to the base station at least one peak reduction tone on at least one frequency resource of the subset of the one or more frequency resources. Other aspects and features are also claimed and described.

26 Claims, 6 Drawing Sheets

(56) References Cited

U.S. PATENT DOCUMENTS

| | | | | |
|---|---|---|---|---|
| 2007/0237247 | A1* | 10/2007 | Schaepperle | H04L 27/2618 375/260 |
| 2007/0242598 | A1* | 10/2007 | Kowalski | H04L 27/2618 370/206 |
| 2010/0080113 | A1* | 4/2010 | Yang | H04L 27/2618 370/344 |
| 2011/0013683 | A1* | 1/2011 | Cepeda Lopez | H04L 27/3411 375/261 |
| 2011/0176500 | A1* | 7/2011 | Wager | H04W 74/004 370/329 |
| 2013/0315320 | A1* | 11/2013 | McGowan | H04L 27/2655 375/260 |
| 2014/0169188 | A1* | 6/2014 | Arambepola | H04L 5/0044 370/252 |
| 2015/0029962 | A1* | 1/2015 | Yun | H04L 27/2692 370/329 |
| 2015/0271001 | A1* | 9/2015 | Lanoiselee | H04L 27/2621 375/260 |
| 2016/0365997 | A1* | 12/2016 | Park | H04L 5/0007 |
| 2017/0019882 | A1* | 1/2017 | Nimbalker | H04W 72/23 |
| 2018/0083820 | A1* | 3/2018 | Agon | H04L 43/0847 |
| 2020/0244502 | A1* | 7/2020 | Nammi | H04L 27/2626 |
| 2022/0132482 | A1* | 4/2022 | Gokceli | H04W 72/044 |
| 2022/0191908 | A1* | 6/2022 | Back | H04W 4/40 |
| 2022/0278882 | A1* | 9/2022 | Back | H04L 27/2614 |

OTHER PUBLICATIONS

Yen P., et al., "PAPR Reduction for Bandwidth-Aggregated OFDM and SC-FDMA Systems", 2011 IEEE Wireless Communications and Networking Conference (WCNC 2011), 2011 IEEE 2011-PHY, Mar. 2011, Cancun, Mexico, Mar. 28-31, 2011, IEEE, Piscataway, NJ, Mar. 28, 2011 (Mar. 28, 2011), XP031876448, pp. 1363-1368, DOI: 10.1109/WCNC.2011.5779328, ISBN: 978-1-61284-255-4, figure 1.

* cited by examiner

US 11,811,571 B2

RESOURCE ALLOCATION FOR PEAK REDUCTION TONES

CROSS-REFERENCE TO RELATED APPLICATIONS

This application claims the benefit of U.S. Provisional Patent Application No. 63/050,582, entitled, "RESOURCE ALLOCATION FOR PEAK REDUCTION TONES," filed on Jul. 10, 2020, which is expressly incorporated by reference herein in its entirety.

TECHNICAL FIELD

Aspects of the present disclosure relate generally to wireless communication systems, and more particularly, to techniques for allocating resources for peak reduction tones in wireless communication systems. Certain implementations of the technology discussed below can enable and provide enhanced communication features and techniques for communication systems, including higher data rates, higher capacity, higher performance, better spectral efficiency, higher mobility, lower memory usage, and lower power device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be access networks that support communications for multiple users by sharing the available network resources.

A wireless communication network may include several components. These components may include wireless communication devices, such as base stations (or node Bs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication at a UE is provided. For example, a method can include receiving an indication of one or more frequency resources that are allocated for uplink communication. The method may also include receiving an indication of a subset of the one or more frequency resources allocated for uplink communication that are also allocated for transmission of one or more peak reduction tones. The method may further include transmitting at least one peak reduction tone on at least one frequency resource of the subset of the one or more frequency resources.

In another aspect of the disclosure, an apparatus configured for wireless communication is provided. For example, the apparatus can include means for receiving an indication of one or more frequency resources that are allocated for uplink communication. The apparatus can also include means for receiving an indication of a subset of the one or more frequency resources allocated for uplink communication that are also allocated for transmission of one or more peak reduction tones. The apparatus may further include means for transmitting at least one peak reduction tone on at least one frequency resource of the subset of the one or more frequency resources.

In an additional aspect of the disclosure, a non-transitory computer-readable medium having program code recorded thereon is provided. The program code can include program code executable by a computer for causing the computer to receive an indication of one or more frequency resources that are allocated for uplink communication. The program code can also include program code executable by the computer for causing the computer to receive an indication of a subset of the one or more frequency resources allocated for uplink communication that are also allocated for transmission of one or more peak reduction tones. The program code may also include program code executable by the computer for causing the computer to transmit at least one peak reduction tone on at least one frequency resource of the subset of the one or more frequency resources.

In another aspect of the disclosure, an apparatus configured for wireless communication is provided. The apparatus includes at least one processor, and a memory coupled to the processor. The at least one processor can be configured to receive an indication of one or more frequency resources that are allocated for uplink communication. The at least one processor can also be configured to receive an indication of a subset of the one or more frequency resources allocated for uplink communication that are also allocated for transmission of one or more peak reduction tones. The at least one processor may be further configured to transmit at least one peak reduction tone on at least one frequency resource of the subset of the one or more frequency resources.

In one aspect of the disclosure, a method of wireless communication at a base station is provided. For example, a method can include transmitting an indication of one or more frequency resources that are allocated for uplink communication. The method may also include transmitting an indication of a subset of the one or more frequency resources allocated for uplink communication that are also allocated for transmission of one or more peak reduction tones. The method may further include receiving at least one peak reduction tone on at least one frequency resource of the subset of the one or more frequency resources.

In another aspect of the disclosure, an apparatus configured for wireless communication is provided. For example, the apparatus can include means for transmitting an indication of one or more frequency resources that are allocated for uplink communication. The apparatus can also include means for transmitting an indication of a subset of the one or more frequency resources allocated for uplink communication that are also allocated for transmission of one or more peak reduction tones. The apparatus may further include means for receiving at least one peak reduction tone on at least one frequency resource of the subset of the one or more frequency resources.

In an additional aspect of the disclosure, a non-transitory computer-readable medium having program code recorded thereon is provided. The program code can include program code executable by a computer for causing the computer to transmit an indication of one or more frequency resources that are allocated for uplink communication. The program code may also include program code executable by the computer for causing the computer to transmit an indication of a subset of the one or more frequency resources allocated for uplink communication that are also allocated for transmission of one or more peak reduction tones. The program code may further include program code executable by the computer for causing the computer to receive at least one peak reduction tone on at least one frequency resource of the subset of the one or more frequency resources.

In another aspect of the disclosure, an apparatus configured for wireless communication is provided. The apparatus includes at least one processor, and a memory coupled to the processor. The at least one processor can be configured to transmit an indication of one or more frequency resources that are allocated for uplink communication. The at least one processor can also be configured to transmit an indication of a subset of the one or more frequency resources allocated for uplink communication that are also allocated for transmission of one or more peak reduction tones. The at least one processor may also be configured to receive at least one peak reduction tone on at least one frequency resource of the subset of the one or more frequency resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chip implementations and other non-module-component based devices (e.g., end-user devices, vehicles, communication devices, computing devices, industrial equipment, retail devices, purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders, summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
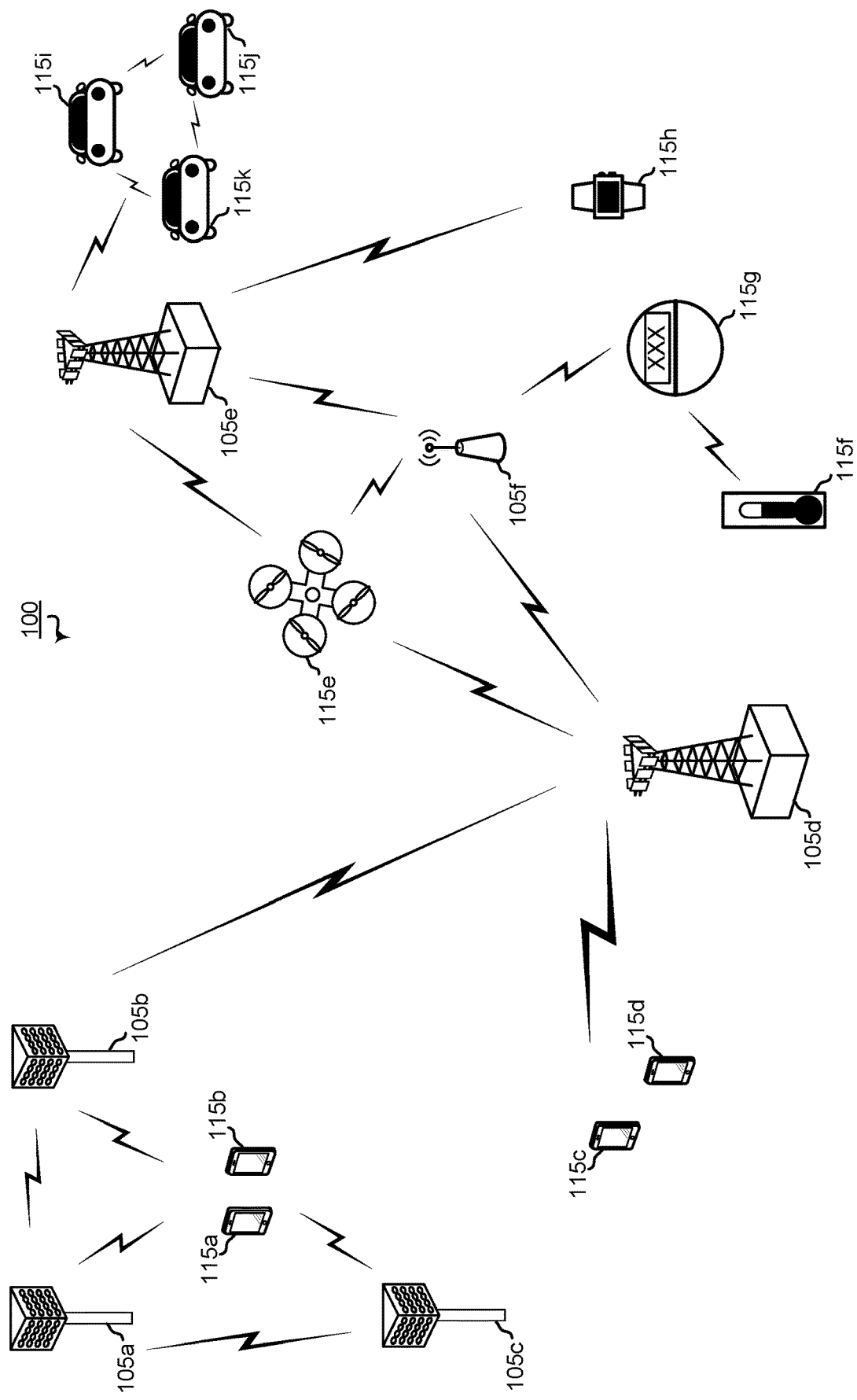
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described implementations. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
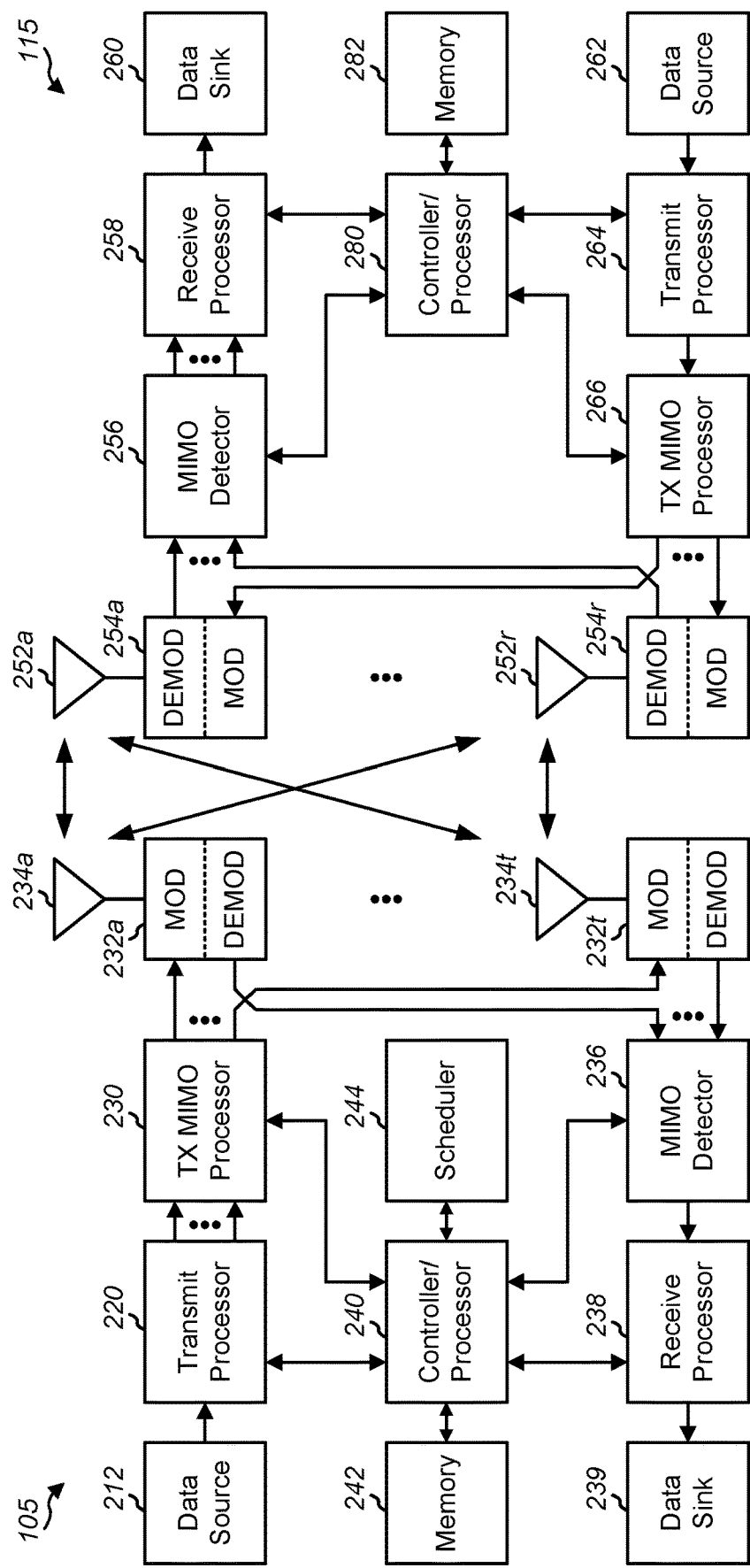
FIG. 2 is a block diagram conceptually illustrating a design of a base station and a UE configured according to some aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3 and 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some aspects of the disclosure, wireless communication that utilizes orthogonal frequency-division multiplexing (OFDM) may exhibit a high peak-to-average power ratio (PAPR). A high PAPR is typically undesirable because it often requires large reductions of transmission power, which in turn may result in reduced transmission power efficiency and/or reduced overall transmission data rate.

PAPR may be reduced in many ways, such as through the use of peak reduction tones (PRTs). As disclosed herein, a tone may refer to a signal transmitted at a certain frequency resource, e.g., a subcarrier, and a PRT may refer to a tone transmitted to reduce a time-domain peak of another signal, such as a data signal. That is, a PRT may adjust the shape of the time-domain representation of the data signal such that a time-domain peak of the data signal is reduced. Many PRTs may be transmitted to reduce many peaks in a signal, e.g., to adjust the shape of the time-domain representation of the data signal. For example, data may be transmitted using certain frequency resources in the frequency domain, and that transmitted data may be associated with a certain time-domain representation, e.g., a time-domain data signal. Along with the data, PRTs may be transmitted using frequency resources in the frequency domain. In the time domain, when the time-domain representation of the transmitted PRTs is combined with the time-domain representation of the transmitted data signal, the PRTs may reduce some of the peaks of the time-domain data signal. As a result, the PAPR associated with transmission of the data signal may be reduced.

Typically, PRTs are transmitted on only frequency resources that are orthogonal to the frequency resources used for the transmission of data. In other words, typically there is no known relation between data tones and PRTs. However, such a limitation to the frequency resources available for PRTs may result in less-than-optimal PAPR reduction.

Figure 3:
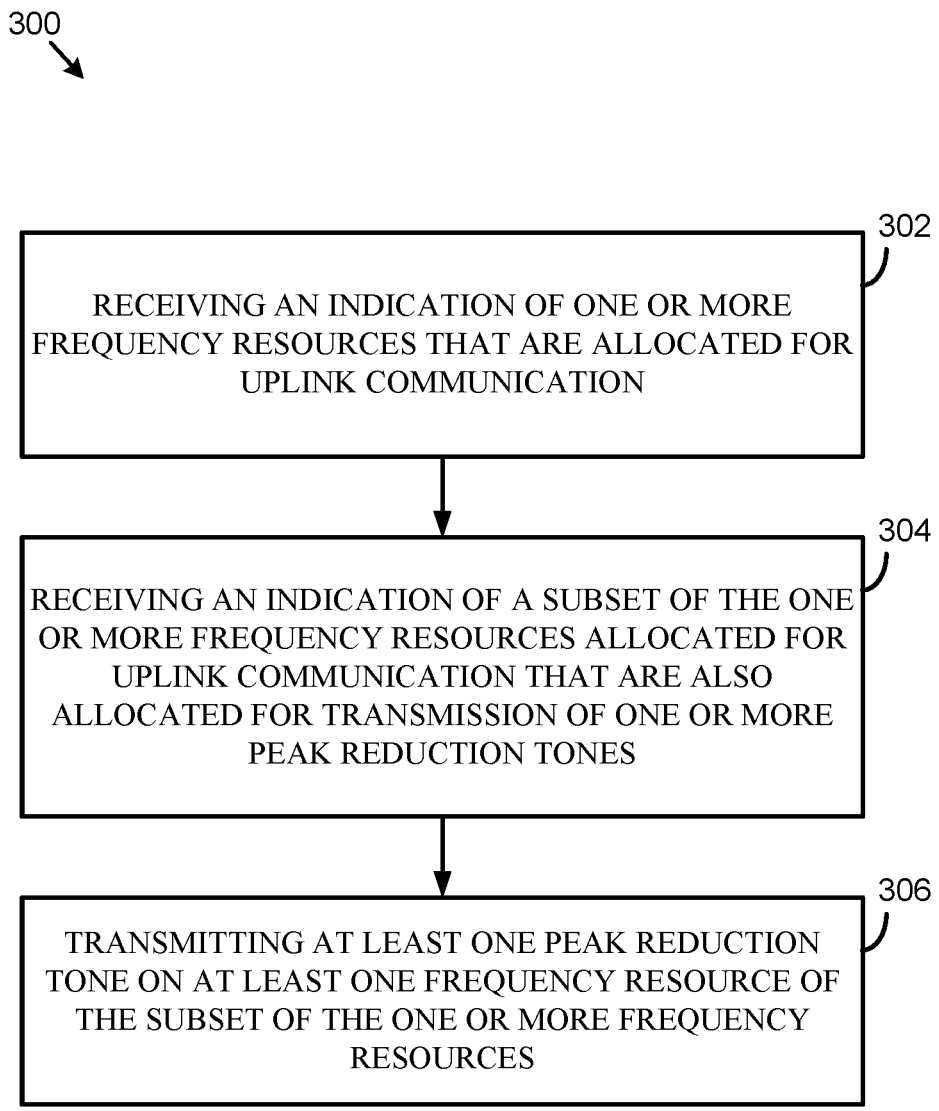
FIG. 3 is a block diagram illustrating a method for resource allocation for peak reduction tones (PRTs) according to some aspects of the present disclosure.

Aspects of the disclosure may provide enhanced techniques for allocating resources for PRTs. For example, in some aspects, the resources may not be limited to only frequency resources that are orthogonal to the frequency resources used for the transmission of data. FIG. 3, as an example, shows a block diagram illustrating a method for resource allocation for PRTs according to some aspects of the present disclosure. Aspects of method 300 may be implemented with various other aspects of this disclosure described with respect to FIGS. 1-2 and 5, such as a mobile device/UE. For example, with reference to FIG. 2, controller/processor 280 of UE 115 may control UE 115 to perform method 300.

Figure 5:
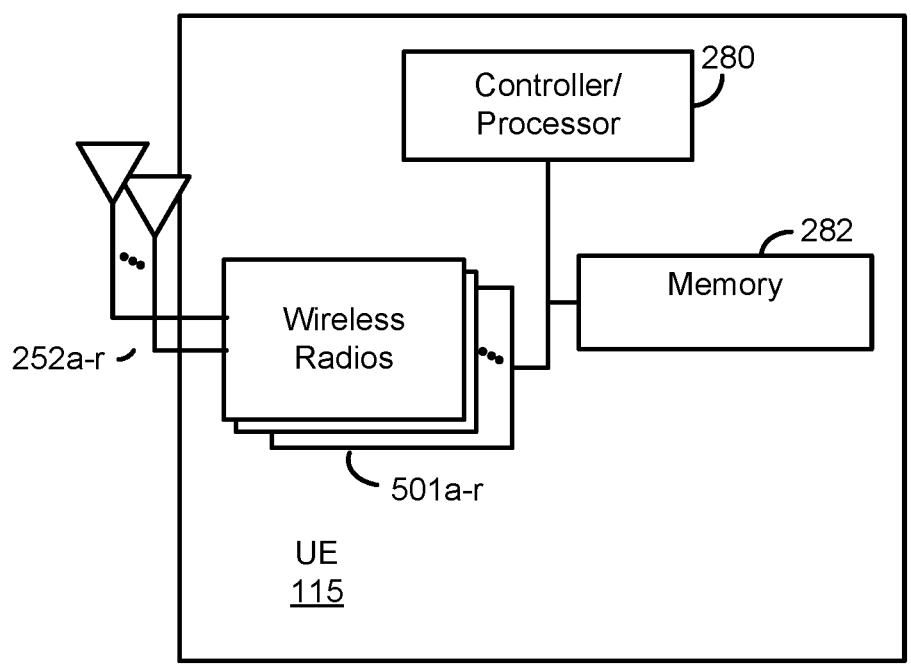
FIG. 5 is a block diagram conceptually illustrating a design of a UE configured according to some aspects of the present disclosure.

The example blocks of method 300 will also be described with respect to UE 115 as illustrated in FIG. 5. FIG. 5 is a block diagram conceptually illustrating a design of a UE configured according to some aspects of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 501a-r and antennas 252a-r. Wireless radios 501a-r include various components and hardware, as illustrated in FIG. 2 for UE 115, including modulator/demodulators 254a-r, MIMO detector 256, receive processor 258, transmit processor 264, and TX MIMO processor 266. The controller/processor 280 can be provided with digital signals obtained from sampling received analog wireless signals for purposes of controlling communication operations.

FIG. 3 illustrates a method 300 that may be performed by a wireless communication device, such as a UE 115. Method 300 includes, at block 302, a UE receiving an indication of one or more frequency resources that are allocated for uplink communication. Similarly, as described below with respect to FIG. 4, a base station, such as a gNB 105, may transmit an indication of one or more frequency resources that are allocated for uplink communication.

In some aspects, uplink communication may refer to the transmission of control information and/or data information from a UE to a base station. For example, uplink communication, e.g., as shown at block 302 of FIG. 3, may refer to information transmitted over a PUCCH and/or a PUSCH. As a specific example, uplink communication may include transmission of an uplink demodulation reference signal (DMRS).

According to some aspects, a frequency resource for wireless communication may refer to a single frequency resource element (RE) or a group of frequency resource elements. In some aspects, a single frequency resource may be referred to as a subcarrier and may correspond to a smallest unit of a frequency of a wireless communication system that can be allocated, e.g., mapped or made available, for transmission and/or reception of information, such as control information, data information, and/or PRTs. In additional aspects of the disclosure, a group of frequency resources may be referred to as resource block (RB) such that an RB can be allocated, e.g., mapped or made available, for transmission and/or reception of information, such as control information, data information, and/or PRTs. In some aspects of the disclosure, the one or more frequency resources that are allocated, e.g., mapped or made available, for uplink communication, e.g., as shown at block 302 of FIG. 3, may refer to one or more subcarriers and/or a one or more RBs.

In some aspects, a UE may also transmit PRTs to reduce PAPR associated with the uplink communication, e.g., information, such as an uplink DMRS, transmitted over a PUCCH and/or a PUSCH. In other words, the PRTs may be transmitted along with the uplink communication. The frequency resources for the PRTs may also be specified by a base station, such as a gNB 105. The specified frequency resources to use for the PRTs may include only resources used for uplink communication, only resources not used for uplink communication, or a combination of resources used for uplink communication and resources not used for uplink communication.

According to some aspects, a UE may be informed by a base station of frequency resources already allocated for uplink communication that may also be allocated for transmission of one or more PRTs. For example, method 300 includes, at block 304, a UE receiving an indication of a subset of the one or more frequency resources allocated for uplink communication that are also allocated for transmission of one or more PRTs. Similarly, as described below with respect to FIG. 4, a base station, such as a gNB 105, may transmit an indication of a subset of the one or more frequency resources allocated for uplink communication that are also allocated for transmission of one or more PRTs. In some aspects, the subset of frequency resources that are allocated for both uplink communication and for transmission of one or more PRTs may be used by a UE to transmit both uplink information and PRTs to a base station.

In some aspects, a UE may also be informed by a base station of frequency resources not already allocated for uplink communication that may also be allocated for transmission of one or more PRTs. For example, a UE may receive an indication of another one or more frequency resources that are allocated for transmission of one or more PRTs. Similarly, a base station may transmit an indication of an other one or more frequency resources that are allocated for transmission of one or more PRTs. In some aspects, the other one or more frequency resources may not include the one or more frequency resources. In other words, the other one or more frequency resources may not include a subset of the one or more frequency resources allocated for uplink communication. According to some aspects, the one or more frequency resources that may not include a subset of the one or more frequency resources allocated for uplink communication may still be used by a UE to transmit PRTs to a base station.

According to some aspects of the disclosure, a UE may transmit PRTs in accordance with one or more indications of frequency resources allocated for transmission of one or more PRTs. For example, method 300 includes, at block 306, a UE transmitting at least one PRT on at least one frequency resource of the subset of the one or more frequency resources. In some aspects, a UE may also transmit at least one other PRT on at least one frequency resource of the one or more frequency resources that may not include a subset of the one or more frequency resources allocated for uplink communication. Similarly, as described below with respect to FIG. 4, a base station, such as a gNB 105, may receive at least one PRT on at least one frequency resource of the subset of the one or more frequency resources. In additional aspects, a base station, such as a gNB 105, may receive at least one other PRT on at least one frequency resource of the one or more frequency resources that may not include a subset of the one or more frequency resources allocated for uplink communication.

In some aspects, a frequency resource used for wireless communication may be used to transmit both an information signal, e.g., control or data information, and a PRT. For example, when a UE transmits a PRT on a frequency resource of the subset of one or more frequency resources allocated for uplink communication, e.g., as shown at block 306 of FIG. 3, the UE may transmit both an information signal and a PRT using that same frequency resource during the same time span. In some aspects, the PRT may be added to an information signal that is to be transmitted using the one or more frequency resources allocated for uplink communication. According to some aspects, the PRT may be added to the information signal such that the PRT is present in only the subset of frequency resources allocated for both uplink communication, i.e., transmission of uplink information, and PRTs.

According to some aspects, the indication of the subset of the one or more frequency resources allocated for both uplink communication and transmission of one or more PRTs may include various types of indications. For example, in some aspects, the indication may include an indication of a frequency offset between a frequency resource of the subset of the one or more frequency resources and a frequency resource of the one or more frequency resources allocated for uplink communication. According to some aspects, the frequency offset may be specified as a number of RBs and/or a number of subcarriers. In some aspects, the frequency resource of the subset of the one or more frequency resources used as a reference for the frequency offset indication may be a frequency resource having the lowest frequency of the subset of frequency resources or a frequency resource having the highest frequency of the subset of frequency resources. In other aspects, the frequency resource of the subset of the one or more frequency resources used as a reference for the frequency offset indication may be a frequency resource having a centermost frequency of the subset of frequency resources. According to some aspects, the frequency resource of the one or more frequency resources allocated for uplink communication used as a reference for the frequency offset indication may be a frequency resource having the lowest frequency of the frequency resources allocated for uplink communication or a frequency resource having the highest frequency of the frequency resources allocated for uplink communication. In other aspects, the frequency resource of the one or more frequency resources allocated for uplink communication used as a reference for the frequency offset indication may be a frequency resource having a centermost frequency of the frequency resources allocated for uplink communication. For example, the frequency resource used as a reference may be a first or last frequency resource of a PUSCH.

In some aspects of the disclosure, the frequency offset indication may be in accordance with one or more time resources that are allocated for at least one of uplink communication or transmission of one or more PRTs. In other words, the frequency offset indication may be transmitted by a base station, and/or received by a UE, in accordance with one or more time resources that are allocated for at least one of uplink communication or transmission of one or more PRTs. In some aspects, a time resource may refer to a single time resource element or a group of time resource elements. In some aspects, a single time resource may be referred to as a symbol and may correspond to a smallest unit of a time period of a wireless communication system that can be allocated, e.g., mapped or made available, for transmission and/or reception of information, such as control information, data information, and/or PRTs. In additional aspects of the disclosure, a group of time resources, e.g., a group of symbols, may be referred to as a half-slot, slot, subframe, frame, etc. such that a group of symbols, such as a half-slot or a slot, can be allocated, e.g., mapped or made available, for transmission and/or reception of information, such as control information, data information, and/or PRTs.

According to some aspects, the frequency offset indication may be in accordance with or based, e.g., determined, transmitted, and/or received, on the one or more time resources that are allocated for at least one of uplink communication or transmission of one or more PRTs. For example, in some aspects, the frequency offset indication may be different for different time resources that are allocated for at least one of uplink communication or transmission of one or more PRTs. As a specific example, a first frequency offset indication for frequency resources associated with a first time resource allocated for at least one of uplink communication or transmission of one or more PRTs, such as a first symbol or a first slot, may be different than a second frequency offset indication for frequency resources associated with a second time resource allocated for at least one of uplink communication or transmission of one or more PRTs, such as a second symbol or a second slot. Accordingly, in some aspects, the indication of the subset of the one or more frequency resources allocated for both uplink communication and transmission of one or more PRTs may include an indication of one or more frequency offsets that are associated with one or more time resources that are allocated for at least one of uplink communication or transmission of one or more PRTs.

In some aspects, the indication of the subset of the one or more frequency resources allocated for both uplink communication and transmission of one or more PRTs may include a number of contiguous frequency resources included in the subset of the one or more frequency resources. According to some aspects, the contiguous frequency resources may be contiguous subcarriers. In some aspects, the contiguous frequency resources may be contiguous RBs. According to some aspects, when the contiguous frequency resources are contiguous RBs, the subcarriers within the contiguous RBs that are available for transmission of PRTs may be contiguous subcarriers of the contiguous RBs or may be non-contiguous subcarriers of the contiguous RBs. In some aspects, the indication of a number of contiguous frequency resources may be in accordance with or based, e.g., determined, transmitted, and/or received, on the one or more time resources that are allocated for at least one of uplink communication or transmission of one or more PRTs. For example, in some aspects, the indication of a number of contiguous frequency resources may be different for different time resources that are allocated for at least one of uplink communication or transmission of one or more PRTs. As a specific example, a first indication of a number of contiguous frequency resources associated with a first time resource allocated for at least one of uplink communication or transmission of one or more PRTs, such as a first symbol or a first slot, may be different than a second indication of a number of contiguous frequency resources associated with a second time resource allocated for at least one of uplink communication or transmission of one or more PRTs, such as a second symbol or a second slot.

According to some aspects, the indication of the subset of the one or more frequency resources allocated for both uplink communication and transmission of one or more PRTs may include a bitmap indicating frequency resources allocated for transmission of one or more PRTs. For example, the bitmap may identify which frequency resources are available for transmission of PRTs and which frequency resources are not available for transmission of PRTs. In some aspects, the bitmap indication may be in accordance with or based, e.g., determined, transmitted, and/or received, on the one or more time resources that are allocated for at least one of uplink communication or transmission of one or more PRTs. For example, in some aspects, the bitmap indication may be different for different time resources that are allocated for at least one of uplink communication or transmission of one or more PRTs. As a specific example, a first bitmap indication for frequency resources associated with a first time resource allocated for at least one of uplink communication or transmission of one or more PRTs, such as a first symbol or a first slot, may be different than a second bitmap indication for frequency resources associated with a second time resource allocated for at least one of uplink communication or transmission of one or more PRTs, such as a second symbol or a second slot.

In some aspects, the indication of the other one or more frequency resources may also be in accordance with or based, e.g., determined, transmitted, and/or received, on the one or more time resources that are allocated for at least one of uplink communication or transmission of one or more PRTs. For example, in some aspects, the indication of the other one or more frequency resources may be different for different time resources that are allocated for at least one of uplink communication or transmission of one or more PRTs. As a specific example, a first indication of the other one or more frequency resources associated with a first time resource, such as a first symbol or a first slot, may be different than a second indication of the other one or more frequency resources associated with a second time resource, such as a second symbol or a second slot.

In some aspects, frequency resources may be allocated for transmission of one or more PRTs dynamically or statically. According to some aspects, when allocated dynamically, the indications of frequency resources allocated for transmission of one or more PRTs may be transmitted by the base station to the UE every time the base station transmits an uplink grant to the UE. For example, a base station may transmit the indications in downlink control information (DCI) transmitted to a UE every time the base station transmits an uplink grant to the UE. As a specific example, within one DCI, a base station may transmit, and a UE may receive, an indication of frequency resources, e.g., the indication of the subset and/or the indication of the other one or more frequency resources, that is in accordance with time resources, as described above, such that a first set of one or more frequency resources may be allocated for transmission of PRTs in a first time resource, such as a first symbol, half-slot, slot, etc., and a second set of one or more frequency resources may be allocated for transmission of PRTs in a second time resources, such as a second symbol, half-slot, slot, etc.

According to some aspects, when allocated statically, the indications of frequency resources allocated for transmission of one or more PRTs may not be transmitted by the base station to the UE every time the base station transmits an uplink grant to the UE. For example, a base station may transmit the indications using radio resource control (RRC) signals.

In some aspects of the disclosure, the indication of the subset of the one or more frequency resources and/or the indication of the other one or more frequency resources may be in accordance with or based, e.g., determined, transmitted, and/or received, at least in part, on at least one of a signal-to-interference-plus-noise ratio (SINR) or modulation and coding scheme (MCS) associated with one or more frequency resources of the subset of the one or more frequency resources. Similarly, the indication of the subset of the one or more frequency resources and/or the indication of the other one or more frequency resources may be in accordance with at least one of a SINR or MCS associated with the one or more frequency resources that are allocated for uplink communication. According to some aspects, a base station may measure SINR associated with one or more frequency resources, e.g., frequency resources that are allocated for uplink communication or more specifically the frequency resources of the subset of the one or more frequency resources. In some aspects, the base station may compare each of the measured SINRs to a threshold SINR. According to some aspects, the base station may select frequency resources to allocate for transmission of one or more PRTs in accordance with the SINR associated with a frequency resource being greater than or equal to the threshold SINR. For example, the subset of the one or more frequency resources allocated for transmission of one or more PRTs may correspond to frequency resources, of the one or more frequency resources that are allocated for uplink communication, whose associated SINRs are greater than or equal to the threshold SINR. In some aspects, when additional frequency resources are needed for transmission of PRTs, the additional frequency resources may be selected from the other one or more frequency resources, i.e., one or more frequency resources that may not include a subset of the one or more frequency resources allocated for uplink communication.

The selection of frequency resources to allocate for transmission of one or more PRTs may also be in accordance with the MCS associated with one or more frequency resources, e.g., frequency resources that are allocated for uplink communication or more specifically the frequency resources of the subset of the one or more frequency resources. According to some aspects, a base station may determine the MCS associated with one or more frequency resources, e.g., frequency resources that are allocated for uplink communication or more specifically the frequency resources of the subset of the one or more frequency resources. In some aspects, the subset of the one or more frequency resources allocated for transmission of one or more PRTs may correspond to frequency resources, of the one or more frequency resources that are allocated for uplink communication, associated with a particular one or more target MCSs. In some aspects, when additional frequency resources are needed for transmission of PRTs, the additional frequency resources may be selected from the other one or more frequency resources, i.e., one or more frequency resources that may not include a subset of the one or more frequency resources allocated for uplink communication.

In some aspects, a UE may also receive an indication of a maximum allowed ratio of a power spectral density (PSD) associated with the at least one PRT to a PSD associated with the uplink communication. In some aspects, the PSD associated with the at least PRT may refer to a PSD associated with the transmission of the at least one PRT on at least one frequency resource of the subset of the one or more frequency resources, e.g., as shown at block 306 of FIG. 3. In additional aspects, the PSD associated with the at least PRT may refer to a PSD associated with the transmission of the at least one PRT on at least one frequency resource of the subset of the one or more frequency resources and at least one frequency resource of the other one or more frequency resources, i.e., one or more frequency resources that may not include a subset of the one or more frequency resources allocated for uplink communication. In some aspects, the PSD associated with the uplink communication may refer to a PSD associated with the transmission of uplink information, such as control information and/or data information.

According to some aspects, a UE may transmit the at least one PRT in accordance with the received maximum allowed ratio. For example, the UE may transmit the at least one PRT such that the ratio of the PSD associated with the at least one PRT to the PSD associated with the uplink communication does not exceed the indicated maximum allowed ratio.

Figure 4:
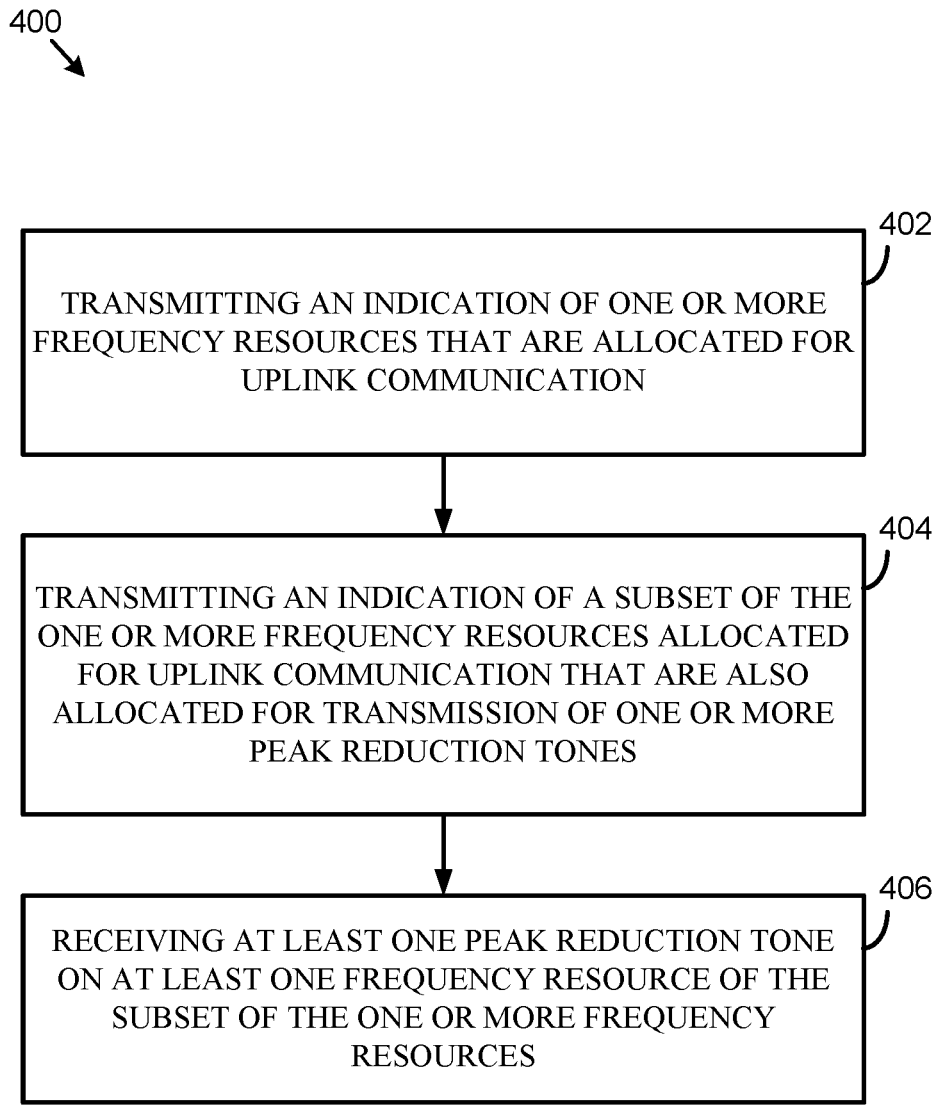
FIG. 4 is another block diagram illustrating another method for resource allocation for PRTs according to some aspects of the present disclosure.

FIG. 4, as an example, shows another block diagram illustrating another method for resource allocation for PRTs according to some aspects of the present disclosure. Aspects of method 400 may be implemented with various other aspects of this disclosure described with respect to FIGS. 1-2 and 6, such as a base station/gNB. For example, with reference to FIG. 2, controller/processor 240 of base station 105 may control base station 105 to perform method 400.

Figure 6:
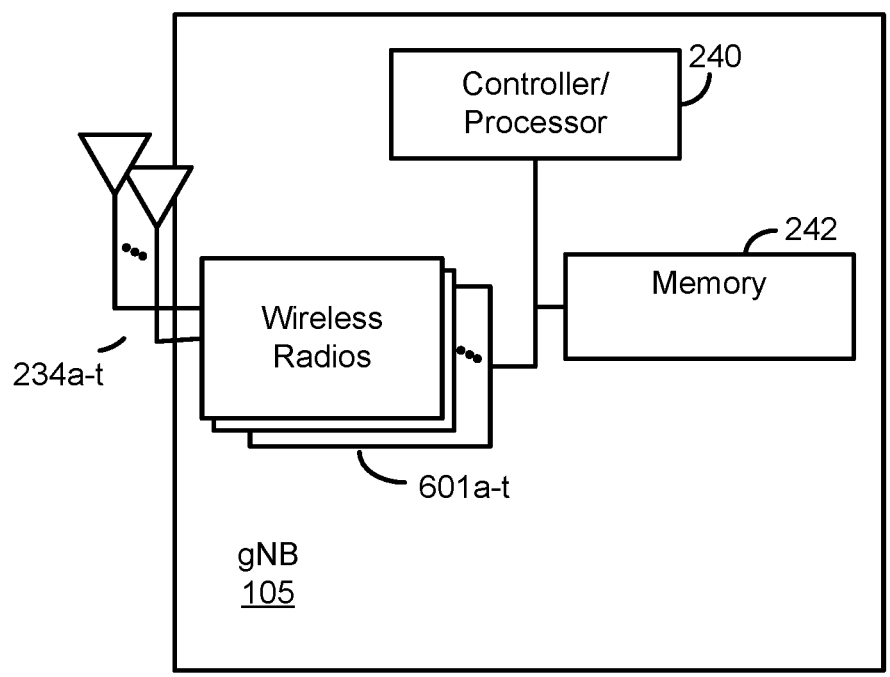
FIG. 6 is a block diagram conceptually illustrating a design of a base station (e.g., a gNB) configured according to some aspects of the present disclosure.

The example blocks of method 400 will also be described with respect to base station 105 as illustrated in FIG. 6. FIG. 6 is a block diagram conceptually illustrating a design of a base station (e.g., a gNB) configured according to some aspects of the present disclosure. Base station 105 may include various structures, hardware, and components, such as those illustrated for base station 105 of FIG. 2. For example, base station 105 includes controller/processor 240, which operates to execute logic or computer instructions stored in memory 242. The controller/processor 240 can also control components of base station 105 that provide the features and functionality of base station 105. Base station 105, under control of controller/processor 240, transmits and receives signals via wireless radios 601a-t and antennas 234a-t. Wireless radios 601a-t include various components and hardware, as illustrated in FIG. 2 for base station 105, including modulator/demodulators 232a-t, MIMO detector 236, receive processor 238, transmit processor 220, and TX MIMO processor 230. The controller/processor 240 can be provided with digital signals obtained from sampling received analog wireless signals for purposes of controlling communication operations.

FIG. 4 illustrates a method 400 that may be performed by a wireless communication device, such as a gNB 105. Method 400 includes, at block 402, a base station transmitting an indication of one or more frequency resources that are allocated for uplink communication. Method 400 also includes, at block 404, a base station transmitting an indication of a subset of the one or more frequency resources allocated for uplink communication that are also allocated for transmission of one or more peak reduction tones. At block 406, method 400 may include a base station receiving at least one peak reduction tone on at least one frequency resource of the subset of the one or more frequency resources.

In some aspects, techniques for allocating resources for PRTs may include a UE receiving, and a base station transmitting, an indication of one or more frequency resources that are allocated for uplink communication. Techniques for allocating resources for PRTs may also include a UE receiving, and a base station transmitting, an indication of a subset of the one or more frequency resources allocated for uplink communication that are also allocated for transmission of one or more PRTs. Techniques for allocating resources for PRTs may also include a UE transmitting, and a base station receiving, at least one PRT on at least one frequency resource of the subset of the one or more frequency resources.

Techniques for allocating resources for PRTs may include additional aspects, such as any single aspect or any combination of aspects described below and/or in connection with one or more other processes described elsewhere herein.

In a first aspect, a UE may receive, and a base station may transmit, an indication of an other one or more frequency resources that are allocated for transmission of one or more PRTs. In some aspects, the other one or more frequency resources may not include the one or more frequency resources that are allocated for uplink communication.

In a second aspect, alone or in combination with the first aspect, a UE may transmit, and a base station may receive, at least one other PRT on at least one frequency resource of the other one or more frequency resources.

In a third aspect, alone or in combination with one or more of the first and second aspects, the indication of the subset of the one or more frequency resource may be in accordance with at least one of a SINR or MCS associated with one or more frequency resources of the subset of the one or more frequency resources.

In a fourth aspect, alone or in combination with one or more of the first through third aspects, the indication of the subset of the one or more frequency resources may include a frequency offset between a frequency resource of the subset of the one or more frequency resources and a frequency resource of the one or more frequency resources.

In a fifth aspect, alone or in combination with one or more of the first through fourth aspects, the indication of the subset of the one or more frequency resources may include a number of contiguous frequency resources included in the subset of the one or more frequency resources.

In a sixth aspect, alone or in combination with one or more of the first through fifth aspects, the indication of the subset of the one or more frequency resources may include a bitmap indicating frequency resources allocated for transmission of one or more PRTs.

In a seventh aspect, alone or in combination with one or more of the first through sixth aspects, at least one of the frequency offset, the number of contiguous frequency resources, or the bitmap may be in accordance with one or more time resources that are allocated for at least one of uplink communication or transmission of one or more PRTs.

In an eighth aspect, alone or in combination with one or more of the first through seventh aspects, a UE may receive, and a base station may transmit, an indication of a maximum allowed ratio of a power spectral density associated with the at least one PRT to a power spectral density associated with the uplink communication.

In a ninth aspect, alone or in combination with one or more of the first through eighth aspects, a UE may transmit, and a base station may receive, the at least one PRT in accordance with the received maximum allowed ratio.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 3 and 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random-access memory (RAM) memory, flash memory, read-only memory (ROM) memory, erasable programmable read-only memory (EPROM) memory, electronically erasable programmable read-only memory (EEPROM) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A wireless communication method at a user equipment (UE), comprising:
   receiving an indication of one or more frequency resources that are allocated for uplink communication;
   receiving an indication of a subset of the one or more frequency resources allocated for uplink communication that are also allocated for transmission of one or more peak reduction tones, wherein the indication of the subset of the one or more frequency resources is in accordance with at least one of a signal-to-interference-plus-noise ratio (SINK) or modulation and coding scheme (MCS) associated with at least one frequency resource of the subset of the one or more frequency resources; and
   transmitting at least one peak reduction tone on at least one frequency resource of the subset of the one or more frequency resources.

2. The method of claim 1, further comprising:
receiving an indication of an other one or more frequency resources that are allocated for transmission of one or more peak reduction tones, wherein the other one or more frequency resources do not include the one or more frequency resources; and
transmitting at least one other peak reduction tone on at least one frequency resource of the other one or more frequency resources.

3. The method of claim 1, wherein the indication of the subset of the one or more frequency resources includes at least one of:
a frequency offset between a frequency resource of the subset of the one or more frequency resources and a frequency resource of the one or more frequency resources;
a number of contiguous frequency resources included in the subset of the one or more frequency resources; or
a bitmap indicating frequency resources allocated for transmission of one or more peak reduction tones.

4. The method of claim 3, wherein at least one of the frequency offset, the number of contiguous frequency resources, or the bitmap is in accordance with one or more time resources that are allocated for at least one of uplink communication or transmission of one or more peak reduction tones.

5. The method of claim 1, further comprising:
receiving an indication of a maximum allowed ratio of a power spectral density associated with the at least one peak reduction tone to a power spectral density associated with the uplink communication; and
transmitting the at least one peak reduction tone in accordance with the received maximum allowed ratio.

6. The method of claim 1, wherein the indication of the subset of the one or more frequency resources includes a frequency offset between a frequency resource of the subset of the one or more frequency resources and a frequency resource of the one or more frequency resources, and wherein the frequency offset is in accordance with one or more time resources that are allocated for at least one of uplink communication or transmission of one or more peak reduction tones.

7. The method of claim 1, wherein the indication of the subset of the one or more frequency resources includes a number of contiguous frequency resources included in the subset of the one or more frequency resources, and wherein number of contiguous frequency resources is in accordance with one or more time resources that are allocated for at least one of uplink communication or transmission of one or more peak reduction tones.

8. An apparatus configured for wireless communication, the apparatus comprising:
at least one processor; and
a memory coupled to the at least one processor, wherein the at least one processor is configured to:
receive an indication of one or more frequency resources that are allocated for uplink communication;
receive an indication of a subset of the one or more frequency resources allocated for uplink communication that are also allocated for transmission of one or more peak reduction tones, wherein the indication of the subset of the one or more frequency resources is in accordance with at least one of a signal-to-interference-plus-noise ratio (SINK) or modulation and coding scheme (MCS) associated with at least one frequency resource of the subset of the one or more frequency resources; and
transmit at least one peak reduction tone on at least one frequency resource of the subset of the one or more frequency resources.

9. The apparatus of claim 8, wherein the at least one processor is further configured to:
receive an indication of an other one or more frequency resources that are allocated for transmission of one or more peak reduction tones, wherein the other one or more frequency resources do not include the one or more frequency resources; and
transmit at least one other peak reduction tone on at least one frequency resource of the other one or more frequency resources.

10. The apparatus of claim 8, wherein the indication of the subset of the one or more frequency resources includes at least one of:
a frequency offset between a frequency resource of the subset of the one or more frequency resources and a frequency resource of the one or more frequency resources;
a number of contiguous frequency resources included in the subset of the one or more frequency resources; or
a bitmap indicating frequency resources allocated for transmission of one or more peak reduction tones.

11. The apparatus of claim 10, wherein at least one of the frequency offset, the number of contiguous frequency resources, or the bitmap is in accordance with one or more time resources that are allocated for at least one of uplink communication or transmission of one or more peak reduction tones.

12. The apparatus of claim 8, wherein the at least one processor is further configured to:
receive an indication of a maximum allowed ratio of a power spectral density associated with the at least one peak reduction tone to a power spectral density associated with the uplink communication; and
transmit the at least one peak reduction tone in accordance with the received maximum allowed ratio.

13. The apparatus of claim 8, wherein the indication of the subset of the one or more frequency resources includes a frequency offset between a frequency resource of the subset of the one or more frequency resources and a frequency resource of the one or more frequency resources, and wherein the frequency offset is in accordance with one or more time resources that are allocated for at least one of uplink communication or transmission of one or more peak reduction tones.

14. The apparatus of claim 8, wherein the indication of the subset of the one or more frequency resources includes a number of contiguous frequency resources included in the subset of the one or more frequency resources, and wherein number of contiguous frequency resources is in accordance with one or more time resources that are allocated for at least one of uplink communication or transmission of one or more peak reduction tones.

15. A wireless communication method at a base station, comprising:
transmitting an indication of one or more frequency resources that are allocated for uplink communication;
transmitting an indication of a subset of the one or more frequency resources allocated for uplink communication that are also allocated for transmission of one or more peak reduction tones, wherein the indication of the subset of the one or more frequency resources is transmitted in accordance with at least one of a signalto-interference-plus-noise ratio (SINK) or modulation and coding scheme (MCS) associated with at least one frequency resource of the subset of the one or more frequency resources; and receiving at least one peak reduction tone on at least one frequency resource of the subset of the one or more frequency resources.

16. The wireless communication method of claim 15, further comprising:

transmitting an indication of an other one or more frequency resources that are allocated for transmission of one or more peak reduction tones, wherein the other one or more frequency resources do not include the one or more frequency resources; and receiving at least one other peak reduction tone on at least one frequency resource of the other one or more frequency resources.

17. The wireless communication method of claim 15, wherein the indication of the subset of the one or more frequency resources includes at least one of:

a frequency offset between a frequency resource of the subset of the one or more frequency resources and a frequency resource of the one or more frequency resources;

a number of contiguous frequency resources included in the subset of the one or more frequency resources; or a bitmap indicating frequency resources allocated for transmission of one or more peak reduction tones.

18. The wireless communication method of claim 17, wherein at least one of the frequency offset, the number of contiguous frequency resources, or the bitmap is determined in accordance with one or more time resources that are allocated for at least one of uplink communication or transmission of one or more peak reduction tones.

19. The wireless communication method of claim 15, further comprising:

transmitting an indication of a maximum allowed ratio of a power spectral density associated with the at least one peak reduction tone to a power spectral density associated with the uplink communication; and receiving the at least one peak reduction tone in accordance with the transmitted maximum allowed ratio.

20. The wireless communication method of claim 15, wherein the indication of the subset of the one or more frequency resources includes a frequency offset between a frequency resource of the subset of the one or more frequency resources and a frequency resource of the one or more frequency resources.

21. An apparatus configured for wireless communication, the apparatus comprising:

at least one processor; and a memory coupled to the at least one processor, wherein the at least one processor is configured to:

transmit an indication of one or more frequency resources that are allocated for uplink communication;

transmit an indication of a subset of the one or more frequency resources allocated for uplink communication that are also allocated for transmission of one or more peak reduction tones, wherein the indication of the subset of the one or more frequency resources is transmitted in accordance with at least one of a signal-to-interference-plus-noise ratio (SINK) or modulation and coding scheme (MCS) associated with at least one frequency resource of the subset of the one or more frequency resources; and receive at least one peak reduction tone on at least one frequency resource of the subset of the one or more frequency resources.

22. The apparatus of claim 21, wherein the at least one processor is further configured to:

transmit an indication of an other one or more frequency resources that are allocated for transmission of one or more peak reduction tones, wherein the other one or more frequency resources do not include the one or more frequency resources; and receive at least one other peak reduction tone on at least one frequency resource of the other one or more frequency resources.

23. The apparatus of claim 21, wherein the indication of the subset of the one or more frequency resources includes at least one of:

a frequency offset between a frequency resource of the subset of the one or more frequency resources and a frequency resource of the one or more frequency resources;

a number of contiguous frequency resources included in the subset of the one or more frequency resources; or a bitmap indicating frequency resources allocated for transmission of one or more peak reduction tones.

24. The apparatus of claim 23, wherein at least one of the frequency offset, the number of contiguous frequency resources, or the bitmap is determined in accordance with one or more time resources that are allocated for at least one of uplink communication or transmission of one or more peak reduction tones.

25. The apparatus of claim 21, wherein the at least one processor is further configured to:

transmit an indication of a maximum allowed ratio of a power spectral density associated with the at least one peak reduction tone to a power spectral density associated with the uplink communication; and receive the at least one peak reduction tone in accordance with the transmitted maximum allowed ratio.

26. The apparatus of claim 21, wherein the indication of the subset of the one or more frequency resources includes a bitmap indicating frequency resources allocated for transmission of one or more peak reduction tones.

* * * * *